United States Patent
Agrawal et al.

(10) Patent No.: US 10,247,567 B2
(45) Date of Patent: Apr. 2, 2019

(54) SHORT-DISTANCE NAVIGATION PROVISION

(71) Applicant: International Business Machines Corporation, Armonk, NY (US)

(72) Inventors: Priyanka Agrawal, Bangalore (IN); Pankaj S. Dayama, Bangalore (IN); Amrita Saha, Bangalore (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

(21) Appl. No.: 15/464,002

(22) Filed: Mar. 20, 2017

(65) Prior Publication Data
US 2018/0266840 A1    Sep. 20, 2018

(51) Int. Cl.
*H04W 4/02* (2018.01)
*G01C 21/36* (2006.01)
(Continued)

(52) U.S. Cl.
CPC ....... *G01C 21/362* (2013.01); *G01C 21/3407* (2013.01); *G01C 21/3626* (2013.01);
(Continued)

(58) Field of Classification Search
CPC .............. G01C 21/362; G01C 21/3484; G01C 21/3602; G01C 21/3691; G01C 21/3453; H04W 4/023; H04W 4/80; G01S 19/42
See application file for complete search history.

(56) References Cited

U.S. PATENT DOCUMENTS

| 5,543,789 A | 8/1996 | Behr et al. |
| 6,128,571 A | 10/2000 | Ito et al. |

(Continued)

FOREIGN PATENT DOCUMENTS

| CN | 201163788 Y | 12/2000 |
| CN | 103903428 B | 5/2016 |

OTHER PUBLICATIONS

Al-Fahoum, Amjed S. et al., "A Smart Infrared Microcontroller-Based Blind Guidance System", Active and Passive Electronic Components, 2013, 8 pages, vol. 2013, Article ID 726480, Biomedical Systems and Informatics Engineering Department, Hijjawi Faculty for Engineering Technology, Yarmouk University, Irbid 21163, Jordan, Hindawi Publishing Corporation.

(Continued)

*Primary Examiner* — Hussein Elchanti
(74) *Attorney, Agent, or Firm* — Ference & Associates LLC

(57) ABSTRACT

One embodiment provides a method, including: utilizing at least one processor to execute computer code that performs the steps of: capturing a wireless signal of a target entity, wherein the wireless signal provides the direction of the target entity with respect to a traveling entity; generating a location profile for the traveling entity, wherein the generating comprises: capturing, using an image capture device, at least one image of the environment surrounding the traveling entity; and determining movement information of the traveling entity, wherein the movement information comprises directional information and speed information; determining the location of the target entity, in view of the environment surrounding the traveling entity; and providing navigation details based upon the location profile, wherein the navigation details comprise instructions for navigating (Continued)

from the location of the traveling entity to the location of the target entity. Other aspects are described and claimed.

19 Claims, 3 Drawing Sheets

(51) Int. Cl.
    *G01S 19/42*     (2010.01)
    *H04W 4/80*     (2018.01)
    *G01C 21/34*     (2006.01)

(52) U.S. Cl.
    CPC ............. *G01S 19/42* (2013.01); *H04W 4/023* (2013.01); *H04W 4/80* (2018.02)

(56) References Cited

U.S. PATENT DOCUMENTS

| | | | |
|---|---|---|---|
| 6,314,368 B1 | 11/2001 | Gurmu et al. | |
| 6,333,735 B1 | 12/2001 | Anvekar | |
| 7,353,110 B2 | 4/2008 | Kim | |
| 7,831,433 B1 | 11/2010 | Belvin et al. | |
| 8,234,063 B2 * | 7/2012 | Dhanani | G01C 21/3617 701/410 |
| 8,312,660 B1 * | 11/2012 | Fujisaki | F41A 17/08 42/70.01 |
| 8,983,300 B1 | 3/2015 | Metrani et al. | |
| 9,080,878 B2 | 7/2015 | Skinder et al. | |
| 9,204,257 B1 | 12/2015 | Mendelson | |
| 2003/0020824 A1 * | 1/2003 | Ito | H04N 5/232 348/345 |
| 2006/0184312 A1 | 8/2006 | Kiim | |
| 2008/0119970 A1 | 5/2008 | Campbell et al. | |
| 2008/0273013 A1 | 11/2008 | Levine et al. | |
| 2012/0188169 A1 | 7/2012 | Yankovich et al. | |
| 2013/0258117 A1 | 10/2013 | Penov et al. | |
| 2013/0325563 A1 * | 12/2013 | Poon | G06Q 10/047 705/13 |
| 2014/0278053 A1 * | 9/2014 | Wu | G06T 11/00 701/408 |
| 2016/0210675 A1 * | 7/2016 | Smart | G06Q 10/02 |
| 2016/0378303 A1 * | 12/2016 | Crilley | G06T 13/80 715/733 |
| 2017/0080900 A1 * | 3/2017 | Huennekens | B60R 25/31 |
| 2017/0115125 A1 * | 4/2017 | Outwater | G08G 1/005 |
| 2017/0343375 A1 * | 11/2017 | Kamhi | G01C 21/3407 |
| 2018/0075287 A1 * | 3/2018 | Elswick | G06K 9/00214 |
| 2018/0137742 A1 * | 5/2018 | Zhang | G08B 25/016 |

OTHER PUBLICATIONS

Chen, Shenchang Eric, "QuickTime VR—An Image-Based Approach to Virtual Environment Navigation", Apple Computer, Inc., 1995, 10 pages, ACM, Inc.

* cited by examiner

SHORT-DISTANCE NAVIGATION PROVISION

BACKGROUND

Navigation systems may be incorporated into a variety of devices, for example, as stand-alone devices, incorporated into smart phones, integrated into a vehicle, and the like. The navigation systems are frequently used to get from one location to another location. The navigation system generally provides step-by-step instructions for navigating to the desired location. For example, a global positioning system (GPS) device may be used by a user to navigate from home to work. The device may provide information related to required turns, traffic, estimated time of arrival, and the like. Accordingly, many users rely on navigation systems to assist in navigating to and around unfamiliar locations.

BRIEF SUMMARY

In summary, one aspect of the invention provides a method, comprising: utilizing at least one processor to execute computer code that performs the steps of: capturing a wireless signal of a target entity, wherein the wireless signal provides the direction of the target entity with respect to a traveling entity; generating a location profile for the traveling entity, wherein the generating comprises: capturing, using an image capture device, at least one image of an environment surrounding the traveling entity; and determining movement information of the traveling entity, wherein the movement information comprises directional information and speed information; determining a location of the target entity with respect to the environment surrounding the traveling entity; and providing navigation details based upon the location profile, wherein the navigation details comprise instructions for navigating from the location of the traveling entity to the location of the target entity.

Another aspect of the invention provides an apparatus, comprising: at least one processor; and a computer readable storage medium having computer readable program code embodied therewith and executable by the at least one processor, the computer readable program code comprising: computer readable program code that captures a wireless signal of a target entity, wherein the wireless signal provides the direction of the target entity with respect to a traveling entity; computer readable program code that generates the location profile for the traveling entity, wherein the generating comprises: capturing, using an image capture device, at least one image of the environment surrounding the traveling entity; and determining movement information of the traveling entity, wherein the movement information comprises directional information and speed information; computer readable program code that determines the location of the target entity, in view of the environment surrounding the traveling entity; and computer readable program code that provides navigation details based upon the location profile, wherein the navigation details comprise instructions for navigating from the location of the traveling entity to the location of the target entity.

An additional aspect of the invention provides a computer program product, comprising: a computer readable storage medium having computer readable program code embodied therewith, the computer readable program code executable by a processor and comprising: computer readable program code that captures a wireless signal of a target entity, wherein the wireless signal provides the direction of the target entity with respect to a traveling entity; computer readable program code that generates the location profile for the traveling entity, wherein the generating comprises: capturing, using an image capture device, at least one image of the environment surrounding the traveling entity; and determining movement information of the traveling entity, wherein the movement information comprises directional information and speed information; computer readable program code that determines the location of the target entity, in view of the environment surrounding the traveling entity; and computer readable program code that provides navigation details based upon the location profile, wherein the navigation details comprise instructions for navigating from the location of the traveling entity to the location of the target entity.

A further aspect of the invention provides a method, comprising: utilizing at least one processor to execute computer code that performs the steps of: broadcasting secure wireless signals between a target entity and a traveling entity, wherein the wireless signal of the target entity provides the direction of the target entity with respect to the traveling entity; detecting at least one object located near the target entity; determining, based upon the wireless signals, a speed of the traveling entity; identifying the location of the target entity with respect to the traveling entity based upon an angle of the target entity with respect to the traveling and based upon the speed of the traveling entity and the direction of the target entity; and providing directions, based upon user preferences, to navigate to the location of the target entity from the traveling entity based upon the angle identified, wherein the directions identify the at least one object located near the target entity.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
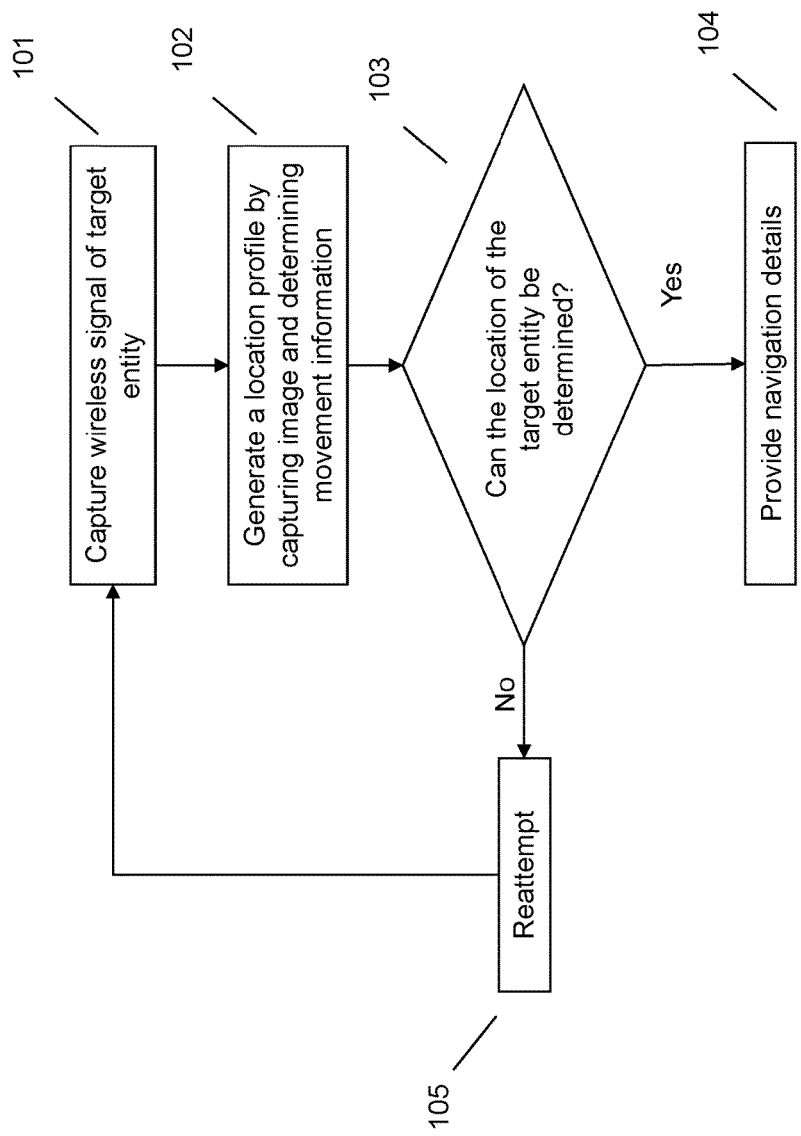
FIG. 1 illustrates a method of providing navigation details regarding objects located near each other.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

While navigation systems are very useful for navigating to particular locations, the navigation system may not be as useful when trying to navigate to a particular point at the location. For example, many navigation systems rely on GPS information which only provides a granularity related to latitude and longitude coordinates. As another example, a navigation device may rely on street addresses, which may only be as accurate as the map loaded onto the navigation device. Accordingly, if a user is trying to find a very particular location, for example, a particular door or suite in a building, the user is generally provided with directions to the building but not to the exact desired location (i.e., the door or suite in this example).

Additionally, with the increase in ride sharing programs which allow users who drive their own vehicles to provide rides to other users, finding a particular unknown user may be difficult. Generally, both the rider and driver are unknown to each other, so it is difficult to identify which person is waiting for a ride and which vehicle is providing the ride. A navigation system may provide directions to a location where the rider is waiting, but the navigation system does not provide a method for identifying the rider or the driver. Current methods rely on the rider and driver to communicate information, for example, estimated time of arrival, nearby objects, descriptive identifying information, and the like. One problem with this method is that it assumes that both the rider and driver have a similar view of the surrounding environment. However, this is frequently not the case. For example, a driver may be behind a large vehicle that blocks the driver from the rider's view. Conversely, the driver cannot see the details of the environment surrounding the rider.

Current navigation systems do not assist in such situations because the systems rely on GPS coordinates, addresses, or the like. Specifically, navigation systems are programmed for the masses and are not intended to be used to find specific people or locations in an environment. The navigation systems are designed to provide directions to a general desired location, rather than a specific point at the desired location. As such, navigation systems are not helpful when trying to locate a particular person from a crowd. However, because of the increase in programs such as ride sharing, delivery drop boxes, and the like, navigation to specific locations would be helpful Accordingly, an embodiment provides a method of providing navigation details for navigating short distances. More specifically, an embodiment provides a method of providing navigation details to a pinpoint location, rather than a general location. The system may receive a wireless signal from a target entity (e.g., user, space, object, etc.). The wireless signal may include information that provides a direction of the target entity with respect to a traveling entity (e.g., a car, a person walking, etc.).

The system may generate a location profile for the traveling entity. Generating the location profile may include capturing at least one image of the environment surrounding the traveling entity. The image may specifically be directed towards the direction of the target entity. For example, based on the direction information derived from the wireless signal, the image capture device may be directed in that direction and the image captured at that point. In one embodiment, the captured image may include a 360 degree image of the surrounding environment. Generating the location profile may also include determining movement information (e.g., speed, direction, distance, etc.) of the traveling entity. The location profile may also be based upon user preferences (e.g., a user familiarity with the location, user details, etc.), a user affinity to surrounding objects, user limitations (e.g., color blindness, knowledge of objects, knowledge of language, etc.). A location profile may also be created for the target entity.

The system may then determine a location of the target entity with respect to the traveling entity. Determining the location may include using the moving information and the direction of the target entity with respect to the traveling entity to identify an angle of the target entity with respect to the traveling entity. The angle may designate where the target entity is with respect to the current location of the traveling entity so that step-by-step directions to the target entity can be provided. Determining the location may also include identifying objects (e.g., other people, landmarks, stationary objects, etc.) located near the target entity. For example, the system may use the captured image to identify which entity within the image is the target entity and then identify objects near the target entity. Once the location of the target entity is determined, the system may provide navigation details to the traveling entity. The navigation details may be based upon the location profile and may include instructions for navigating from the location of the traveling entity to the location of the target entity. Thus, the navigation details may include step-by-step details for traversing the last short distance between the traveling entity and the target entity.

Such a system provides a technical improvement over current systems used for navigation. Specifically, the system described herein provides a method and technique for providing detailed directions for short distances. For example, a current navigation system may provide directions to a general location. The navigation system as described herein can then provide directions to the specific location. As an example, if a user is within ten feet of another user, the navigation system as described herein could provide detailed directions to navigate that last ten feet to the user. Accordingly, the systems and methods as described herein provide a method for providing navigation details to a pinpoint location, rather than a general location as with traditional navigation systems.

For ease of understanding, the ride sharing example will be used throughout. However, the systems and methods as described herein may be applied to any navigation within short distances. For example, the systems and methods as described herein can be implemented for finding particular points or locations within a larger space. As an example, some shipping services and shopping retailers are using delivery drop boxes. Using a delivery drop box, a package bought by a buyer will be left in a locker or other secure facility/location for the buyer to pick-up. The secure location is generally part of a larger complex, for example, a building, and the like. While a typical navigation system can provide directions to the building, the navigation system would not be able to provide directions to the specific secure location of the buyer's package. However, the navigation system as described herein could be used to provide details to the secure location.

The navigation system as described herein may be launched upon a signal from a user, for example, a user may specifically start the system. The described navigation system may also be used in conjunction with conventional navigation systems. For example, the system may receive a signal from a GPS system that the target entity is within a predetermined threshold distance of the traveling entity, which launches the described navigation system. The threshold distance may include a default value, may be set by a user, or may vary according to the situation. For example, the threshold distance may be fifty feet, ten meters, one-hundred yards, and the like. The described navigation system may also automatically launch, for example, when the wireless signal of the target entity is detected, based upon an estimated distance, based upon a detected number of people (e.g., the target entity is in a crowd, etc.), and the like.

Figure 2:
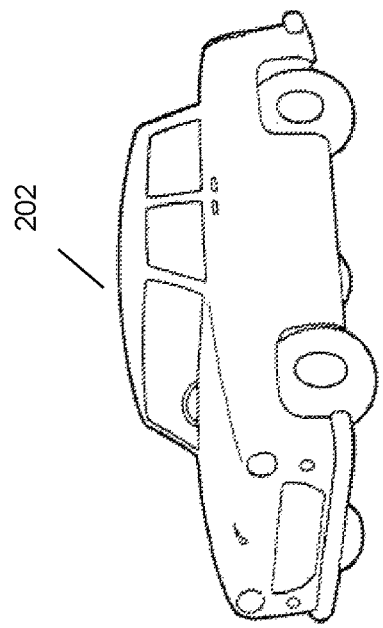
FIG. 2 illustrates an example short-distance based navigation.
Figure 2:
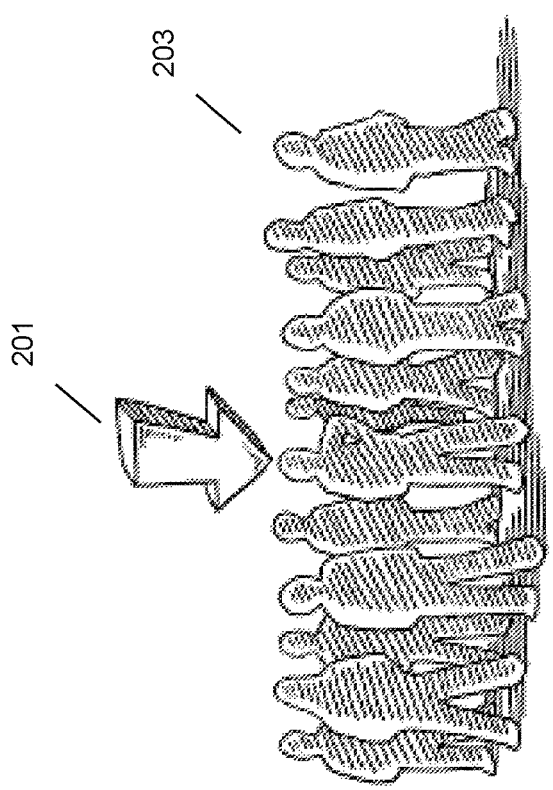

Referring now to FIG. 1, the system may capture a wireless signal of a target entity. While the target entity as described throughout will be described as the rider waiting for the car (i.e., traveling entity in this example), the target entity may also be the car, with the rider walking towards the car being the traveling entity. The wireless signal may include or provide information related to a direction of the target entity with respect to a traveling entity. For example, different wireless signals can identify the path, and accordingly the direction, of the information. The traveling entity may also broadcast a wireless signal. The system may then establish a secure wireless communication between the target entity and the traveling entity using the wireless signals of the target and traveling entity. The secure communication may also ensure that other users do not receive incorrect navigation information. For example, many users may be waiting, at a street corner, for a ride-share vehicle. Thus, to ensure that the users do not enter the incorrect vehicles, the wireless communication may act to identify the correct drivers and corresponding riders.

Establishing the protocol for the secure communication may include exchanging authentication messages between the target entity device and the traveling entity device. The encryption and validation for the authentication messages may be included when the rider first books the driver and the driver accepts the booking. As another example, rather than authentication message exchanges, the system may merely provide device identifying information (e.g., device name, device serial number, device network information, etc.) to the other device. For example, when a rider requests a ride, the name of the device may be transmitted to the driver accepting the ride request. The name of the device of the driver may be transmitted to the rider's device. Accordingly, when the devices are in close proximity, the devices recognize the other device by the identifying information and establish a secure wireless communication connection.

At 102, the system may generate a location profile for the traveling entity. The location profile may provide information related to the current location of the traveling entity and may also provide information identifying a distance to the target entity. Generating the location profile may include capturing, using an image capture device (e.g., camera, video camera, etc.), at least one image of the environment surrounding the traveling entity. As an example, the system may capture a 360 degree image(s) of the surrounding environment. As another example, the camera may be directed in the direction of the target entity, identified using the wireless signal, and capture an image while directed in that direction.

Generating the location profile may also include determining movement information related to the traveling entity. Movement information may include directional information and speed information. The directional and speed information may be derived, at least in part, from the wireless signals. As discussed before, the wireless signal and connection may identify the direction of an entity. Thus, the direction of the traveling entity may be derived in a similar manner. As an example for deriving the speed information, the system may identify the speed of receipt of the target entity wireless signal. Based upon the communication protocol, the system may determine the speed of the traveling entity using time between pings of the wireless signal. The directional and speed information may also be captured from other devices, for example, a compass, a conventional navigation system, communication with a vehicle, and the like.

The location profile may also include additional information, for example, user preferences. For example, a user may set different preferences within the system. As an example, the user may prefer that navigation details are provided in a particular way. User preferences may also include information related to the history of the user. For example, the system may identify the location of the target entity as a location frequently accessed by the traveling entity. Accordingly, the system may provide fewer navigation details. User preferences may also include details about the user, for example, the details may include user limitations, user affinity to surrounding objects, and the like. User limitations may include physical limitations of the user (e.g., color-blindness, hearing impairment, etc.), limitations related to the user's vehicle (e.g., size of the vehicle restricts location of the vehicle, maneuverability, etc.), a user's knowledge of objects or language (e.g., the instructions will not include objects the user is unfamiliar with, the instructions include more details if a user is unfamiliar with an object, the instructions are provided in a particular language, the instructions do not include details regarding signs having a language the user is unfamiliar with, etc.), and the like.

A user affinity to surrounding objects may generate instructions including particular objects. For example, if the user prefers to navigate via street signs or landmarks, the instructions may include reference to street signs and landmarks as much as practical. On the other hand, if the user dislikes instructions including certain objects, the instructions may not include references to these objects as much as practical. Accordingly, the system may provide navigation details tailored to these details. A location profile may also be generated for the target entity.

At 103 the system may determine if a location of the target entity with respect to the environment surrounding the traveling entity can be determined. In other words, the system may determine if the target entity can be identified from the environment. The system may also determine the location of the target entity with respect to the traveling entity. For example, referring to FIG. 2, the target entity 201 may be identified from the surrounding environment 203 with respect to the traveling entity 202. Determining the location of the target entity may also include identifying the angle of the target entity with respect to the traveling entity. The angle may be computed using the location profile and/or speed and direction information.

Determining a location of the target entity may include identifying objects located near the target entity. For example, the system may use the captured image to identify the target entity and objects near the target entity. The objects may include other people, landmarks, stationary objects, and the like. Identifying objects may include using other methods. For example, the system may identify other wireless signals and the location of the wireless signals with respect to the target location. Using this example, the system may then provide details which state that at least two additional wireless signals are to the right of the target entity. The location of the target entity may also be determined from the image. For example, the system may specifically identify the target entity and provide this information to the traveling entity. As an example, the system may provide a picture of the target entity derived from the captured image.

If the system cannot determine the location of the target entity at 103, the system may reattempt the location detection at 105 and return to 101. If, however, the location of the target entity can be determined at 103, the system may provide navigation details at 104. The navigation details may include instructions for navigating from a current location of the traveling entity to the location of the target entity. The navigation details may also include additional details. For example, the navigation details may provide information related to the objects near the target object. As an example, the target entity may be a person in a blue shirt. On the left of the user may be a person in a red shirt and on the right of the user may be a street sign. The navigation details may include such details. The navigation details may be based upon the location profile. Accordingly, the navigation details may be derived in part based upon the direction and speed of the traveling entity. Additionally, the volume or detail of the navigation details may be based upon the user preferences.

Figure 3:
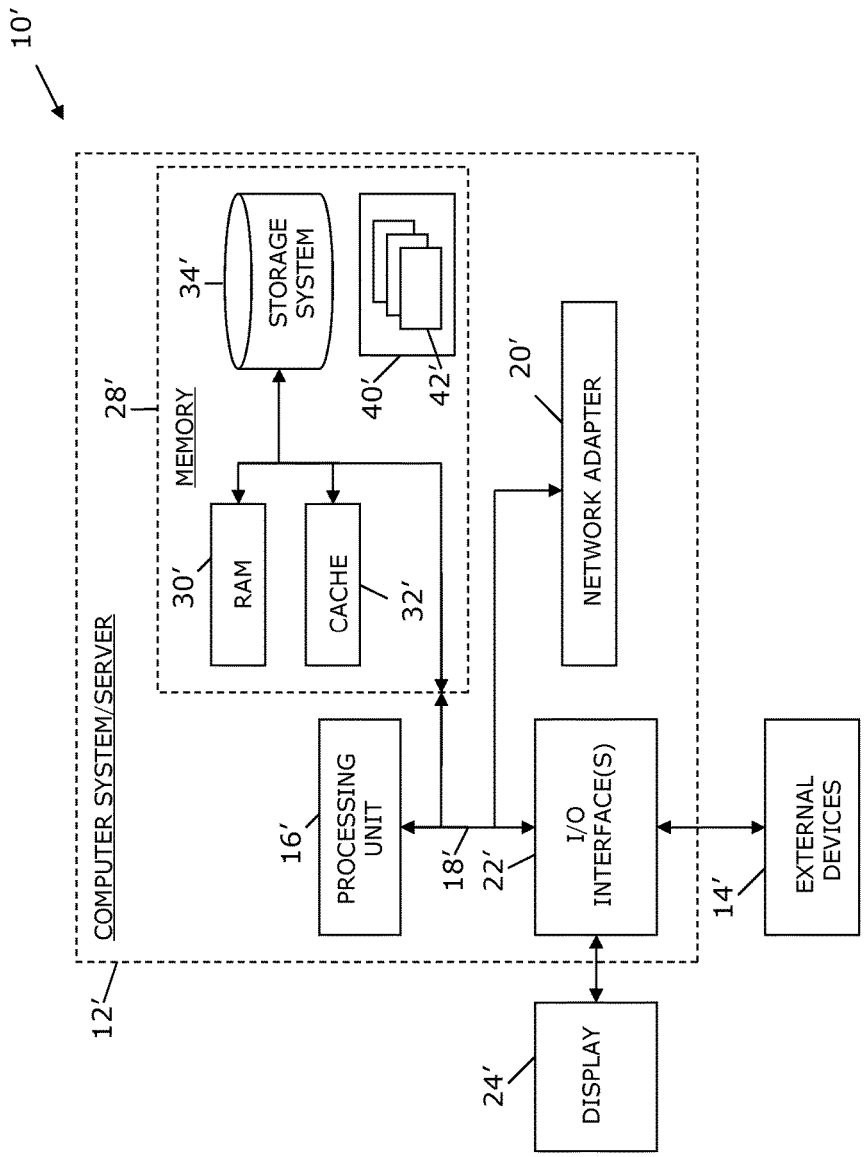
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/ server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
capturing a wireless signal from a device of a target entity, wherein the wireless signal provides the direction of the target entity with respect to a traveling entity;
generating a location profile for the traveling entity, wherein the generating comprises:
capturing, using an image capture device, an image of the environment surrounding the traveling entity; and
determining movement information of the traveling entity, wherein the movement information comprises directional information and speed information;
identifying the location of the target entity, in view of the captured image of the environment surrounding the traveling entity, wherein the identifying comprises identifying the target entity from the captured image by correlating the wireless signal of the device of the target entity with the movement information of the traveling entity to identify the target entity within the captured image; and
providing, based upon the identified location of the target entity, navigation details, wherein the navigation details comprise instructions for navigating from the location of the traveling entity to the location of the target entity.

2. The method of claim 1, wherein the traveling entity broadcasts a wireless signal for communicating with the target entity.

3. The method of claim 2, comprising establishing a secure wireless communication between the target entity and the traveling entity based on both the wireless signal of the target entity and the wireless signal of the traveling entity.

4. The method of claim 1, wherein the generating comprises accessing user preferences related to how navigation details should be provided.

5. The method of claim 4, wherein the navigation details are based upon the user preferences.

6. The method of claim 4, wherein the user preferences are based upon a user familiarity with the location of the target entity.

7. The method of claim 1, comprising receiving a global positioning system signal indicating the target entity is within a predetermined threshold distance of the traveling entity.

8. The method of claim 1, wherein the identifying comprises determining a location of the target entity with respect to the traveling entity based upon an angle of the target entity with respect to the traveling entity.

9. The method of claim 1, wherein the identifying comprises identifying objects located near the target entity and wherein the providing navigation details comprises providing information related to the objects identified near the target entity.

10. The method of claim 9, wherein the identifying objects comprises using the image of the environment surrounding the traveling entity to identify the objects.

11. An apparatus, comprising:
at least one processor; and
a computer readable storage medium having computer readable program code embodied therewith and executable by the at least one processor, the computer readable program code comprising:
computer readable program code that captures a wireless signal from a device of a target entity, wherein the wireless signal provides the direction of the target entity with respect to a traveling entity;
computer readable program code that generates a location profile for the traveling entity, wherein the generating comprises:
capturing, using an image capture device, an image of the environment surrounding the traveling entity; and
determining movement information of the traveling entity, wherein the movement information comprises directional information and speed information;
computer readable program code that identifies the location of the target entity, in view of the captured image of the environment surrounding the traveling entity, wherein the identifying comprises (i) identifying the target entity from the captured image by correlating the wireless signal of the device of the target entity with the movement information of the traveling entity to identify the target entity within the captured image and (ii) identifying objects near the target entity from the captured image; and
computer readable program code that provides, based upon the identified location of the target entity, navigation details, wherein the navigation details comprise instructions for navigating from the location of the traveling entity to the location of the target entity.

12. A computer program product, comprising:
a non-transitory computer readable storage medium having computer readable program code embodied therewith, the computer readable program code executable by a processor and comprising:
computer readable program code that captures a wireless signal from a device of a target entity, wherein the wireless signal provides the direction of the target entity with respect to a traveling entity;
computer readable program code that generates a location profile for the traveling entity, wherein the generating comprises:
capturing, using an image capture device, an image of the environment surrounding the traveling entity; and
determining movement information of the traveling entity, wherein the movement information comprises directional information and speed information;
computer readable program code that identifies the location of the target entity, in view of the captured image of the environment surrounding the traveling entity, wherein the identifying comprises (i) identifying the target entity from the captured image by correlating the wireless signal of the device of the target entity with the movement information of the traveling entity to identify the target entity within the captured image and (ii) identifying objects near the target entity from the captured image; and computer readable program code that provides, based upon the identified location of the target entity, navigation details, wherein the navigation details comprise instructions for navigating from the location of the traveling entity to the location of the target entity.

13. The computer program product of claim 12, comprising establishing a secure wireless communication between the target entity and the traveling entity based on both the wireless signal of the target entity and a wireless signal of the traveling entity.

14. The computer program product of claim 12, wherein the generating comprises accessing user preferences related to how navigation details should be provided.

15. The computer program product of claim 14, wherein the navigation details provided are based upon the user preferences.

16. The computer program product of claim 12, comprising receiving a global positioning system signal indicating the target entity is within a predetermined threshold distance of the traveling entity.

17. The computer program product of claim 12, wherein the identifying comprises determining a location of the target entity with respect to the traveling entity based upon an angle of the target entity with respect to the traveling entity.

18. The computer program product of claim 12, wherein the identifying comprises identifying objects located near the target entity and wherein the providing navigation details comprises providing information related to the objects identified near the target entity.

19. The computer program product of claim 18, wherein the identifying objects comprises using the image of the environment surrounding the traveling entity to identify the objects.

* * * * *